Feb. 6, 1934.　　　H. J. ROBERTSON, JR　　　1,946,237
OUTLET FOR ELECTRICAL CONDUITS AND METHOD OF APPLYING THE SAME
Filed April 17, 1931
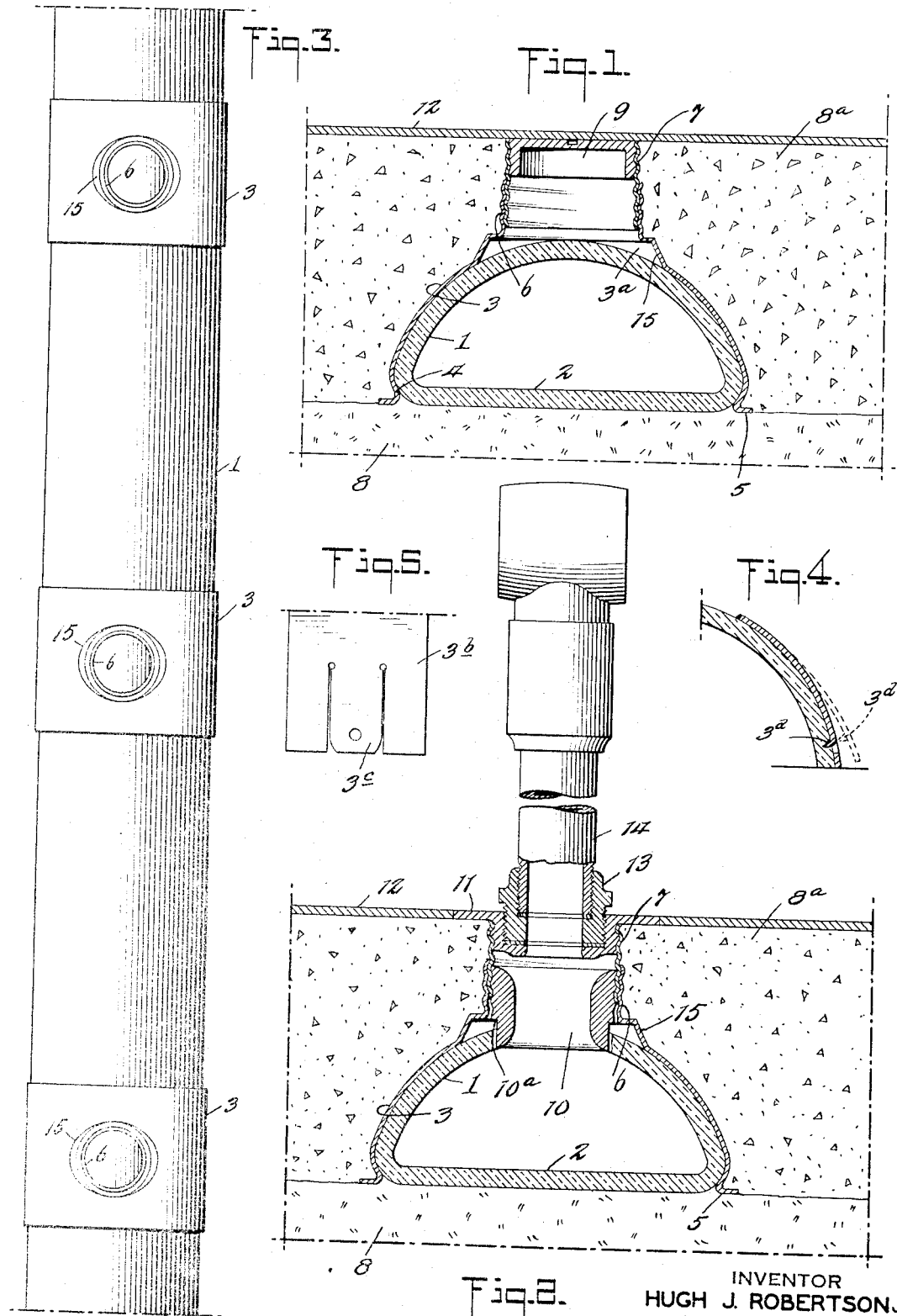
INVENTOR
HUGH J. ROBERTSON JR
BY
ATTORNEYS Patented Feb. 6, 1934

1,946,237

UNITED STATES PATENT OFFICE 1,946,237

OUTLET FOR ELECTRICAL CONDUITS AND METHOD OF APPLYING THE SAME

Hugh J. Robertson, Jr., New York, N. Y., assignor to The Fibre Conduit Company, Orangeburg, N. Y., a corporation of New York Application April 17, 1931. Serial No. 530,848

1 Claim. (Cl. 247—28)

In the present system of wiring a building, it is usual to bury the ducts or conduits for the wire in the floor material, and to so distribute them throughout the floor surface that access may be had at practically any point of the floor area where it may be found desirable to make an electrical connection. An electrical connection is usually made after the floor is laid, by opening the floor at a desired point over a duct buried therein, making an opening then in the top of the duct, applying an "outlet" in the opening in such way as to support it on the duct, repairing the floor around the outlet, and then attaching to the outlet an electric fixture. With this method, usually employed when a fibre duct is used, the duct remains intact until it is to be used and is then opened only at the point or points where electrical connection is to be made. In another method, employed usually with metal ducts, the duct is equipped with a large number of evenly spaced outlets, so-called "pre-set outlets", before it is laid and the floor material is poured around it. In any system of floor duct construction, access is had to the wires in the duct, through the "outlets", buried in the floor material and extending through it to the floor surface.

It has been found desirable, when pre-set outlets are used, to be able to vary the arrangement of spacing. Some buildings may require on one floor that the outlets be set, say, eighteen inches apart, while on another floor, a greater space between outlets may be wanted. It is also desirable that the duct remain intact while the floor is being laid and until it is to be opened at a point where an electrical connection is to be made.

My invention seeks to provide a wiring outlet which may be readily applied to an already laid wiring duct without opening the duct. After the duct is laid, its lower side is not accessible—being in contact with the floor material or with its support thereon. I provide a saddle-shaped outlet which may be placed on the outside of the duct after it is laid, and be securely held thereon. The saddle-shaped outlet comprises an open supporting base concaved to snugly fit and rest upon the outer curved surface of the conduit wall, and a tubular neck projecting from and in open communicaton with said base to allow passage for electric wires and clamping arms or sides forming a yoke extending laterally therefrom and shaped to closely engage the outside walls of the duct. The position of the outlet is not controlled by prearranged openings through the duct, so that variable spacing may be used for it. As the duct remains intact, access of the floor material to its interior, in course of laying, is prevented even after the outlet is applied, an incident of other methods, owing to accidental omission or displacement of the cap which is used to seal the outlet until used. Also the interior surface of the duct being uninterrupted by passages or outlet fittings, presents a smooth way for the ends of the "fishing" wires. The outlet of my invention may be applied to a wiring duct in an already finished floor structure by excavation and refinishing of the latter, but it is primarily intended that a number of these outlets be applied at intervals along the duct after it is laid but before it is covered with the concrete or other fill in the process of laying the floor.

In the accompanying drawing—

Figure 1 shows in cross-section one form of duct having my improved outlet applied.

Figure 2 shows the same after the duct has been opened, and showing one method of applying an electric fitting thereto.

Figure 3 is a plan view.

Figure 4 is a partial sectional view of a modified construction, and

Figure 5, a side view thereof.

I have illustrated in the drawing a form of duct or conduit 1 now in use, which may be of the arch shape shown, with or without the bottom 2, and having the rounded form at the bottom edges shown. The conduit outlet comprises a concave base having a wire outlet opening and a tubular neck or collar projecting from said base; the base member having means for attaching it to the conduit and the neck or collar carrying means for attaching an electric fixture, such as a floor riser. The preferred means for attaching the outlet to the duct after the latter is laid consists in a saddle-shaped clamp or clasp, preferably of thin sheet metal, so dimensioned with respect to the dimensions of the duct that it will closely embrace the duct when applied thereto, and by clasping the sides of the latter, will be held firmly in place. It may thus comprise the inverted U, saddle member 3 of resilient metal, having its sides forming yoke arms curved downwardly, and long enough to extend over the upper part of the duct and engage beneath the lower edges of the latter, when the latter has the form shown in Figures 1 and 2. Its sides may be inturned, as shown at 4 in Figure 1, to engage beneath the rounded lower edges of the duct and have outturned edges or flanges 5 to anchor it in the cement floor when the latter is laid. This form also facilitates the slipping of the saddle-shaped clamp over the duct.

An alternative form for use for example with ducts lacking the bottom 2 and having their lower edges in direct contact with the floor material or a supporting pad or bench thereon so that the lower ends of the clamp cannot pass below the edges of the duct, is illustrated in Figure 4, in which the thin plate 3b of yielding but non-resilient metal has the tongue 3c at its lower edge, provided with a sharp projection 3d which may be driven into the duct when the tongue 3c is forced into contact with the latter. Only a portion of the outlet is shown in Figures 4 and 5. The remainder will conform to the shape of the duct and straddle it like the form shown in Figure 1 and have the same construction on the part above the duct.

The width of the saddle-shaped clamp lengthwise of the conduit is such as to prevent the tilting of the outlet assembly by longitudinal strains, and hold it firmly while the cement of the floor is being poured. At the top of the member 3, an aperture 3a of suitable diameter is provided, around the margin of which is formed or attached an interiorly screw-threaded outlet neck or nipple 6 not supported by being attached to the duct by engagement within an aperture made in the duct top, as in the construction now usual, it being here supported by the yoke arms 3 entirely outside the duct and it can therefore be applied without opening the top of the duct. Within it may be screwed the threaded ring 7 which is adjustable to the height desired, and to which may be applied the electric fixture or floor riser. I have here shown a flanged nut 11, the flange of which is of the thickness of the floor covering 12, an adjustable bushing 13, and part of a floor riser tube or pipe 14. Any other form of fixture and method of applying it to the outlet assembly may be employed. For example, the pipe 14 may be of larger diameter and be screwed directly into the nut 11. The construction of the outlet assembly clamp, as here illustrated, has a laterally extended boss 15 to afford a plane surface tangential to the curve of the clamp, through which the aperture 3a is made, and to stiffen the resilient action of the clamp, and increase the resistance of the clamp to the load to be sustained by the nipple.

In one way of laying a floor in which this invention is to be used, the bottom course of the floor is, as illustrated at 8, first laid. The duct 1 is then laid directly thereon as shown. Any other preferred way of providing support for the duct, may be employed. The saddle-shaped clamps, comprising the neck 6 and the yoke arms 3 extending laterally therefrom, are then applied thereto at optional intervals along its length, by forcing them down over the duct from the top so that they will be securely held thereon as by the resilient action of the yoke arms, or by forcing in the pointed projections 3d. The rings 7 may be thereupon applied to the individual saddle-shaped clamps, or they may be in place when the clamps are applied to the duct. The duct is preferably left imperforate until any particular outlet is to be used for attaching a floor riser as shown in Figure 1. The ring 7 is adjusted to a height which will bring its top edge flush with the floor surface. The upper portion 8a of the cement flooring is then poured, whereupon the duct is completely buried beneath the floor, as well as the outlet assembly and the ring 7 up to or near the floor surface. A cap 9 is placed in the top of the ring 7 while the floor is being poured to prevent access of cement to the interior of the ring. Should for any reason the cap 9 have been displaced or not used and any cement get within the ring while the floor is being laid, or the outlet itself dislodged, cement will not enter the duct and can be readily chipped out or removed when the outlet is to be used. Also no water can leak into the duct and impair the insulation of the wires therein. When the outlet is to be used, a hole is made as usual through the floor covering 12, if any, the cap 9 is removed, and a hole made through the conduit, as shown in Figure 2, immediately below the ring 7. A ferrule 10, preferably of insulating material, having its central passage flared at both ends, is then fastened in place, preferably by screwing it down in the ring 7 until the shoulder 10a on the ferrule comes into supporting contact with the top of the duct. The rounding of the ends of the passage through the ferrule facilitates the making of proper electrical connections from the wires within the duct to the floor riser or other fixture, without abrasion of the insulation.

The structure of my invention has two important advantages: the placing of the outlet is made optional and selective, and the opening of the duct may be delayed until the use of any outlet is elected. The structure here described involves a duct buried in the floor material, in connection with which outlet assemblies are used which are applied before the floor material is poured—but in which the duct, at the outlet, preferably remains imperforate until access is to be had at that point.

I claim:—

In an underfloor duct system, the combination with a conduit having an imperforate wall presenting a curved outer surface, of a pre-set conduit outlet comprising a concave base shaped to snugly fit and rest upon said curved surface and having a wire outlet opening, a tubular neck or collar supported by and projecting from said base in registry with said outlet opening, and fastening means carried by said outlet base engaging said conduit, whereby an outlet port can be cut through the wall of said conduit in registry with the opening through said outlet when the same is to be used.

HUGH J. ROBERTSON, Jr.